C. R. HARTMAN.
Subsoil Plow.
No. 76,627.
Patented April 14, 1868.
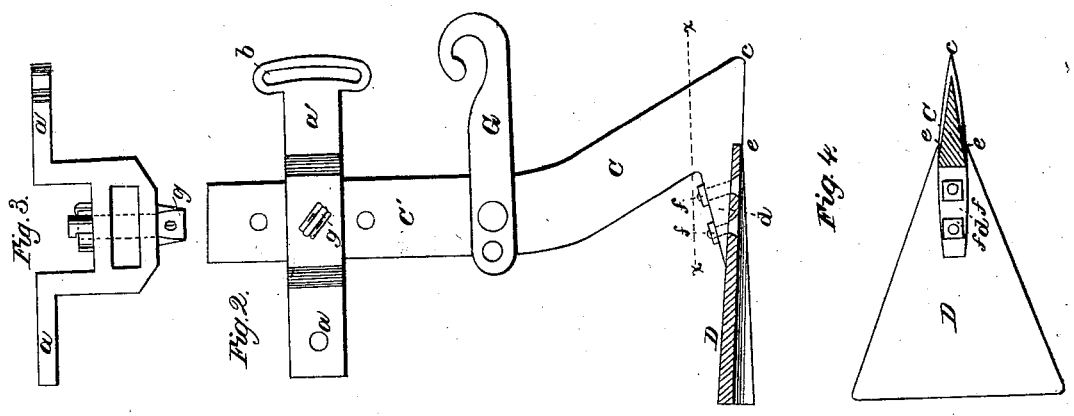
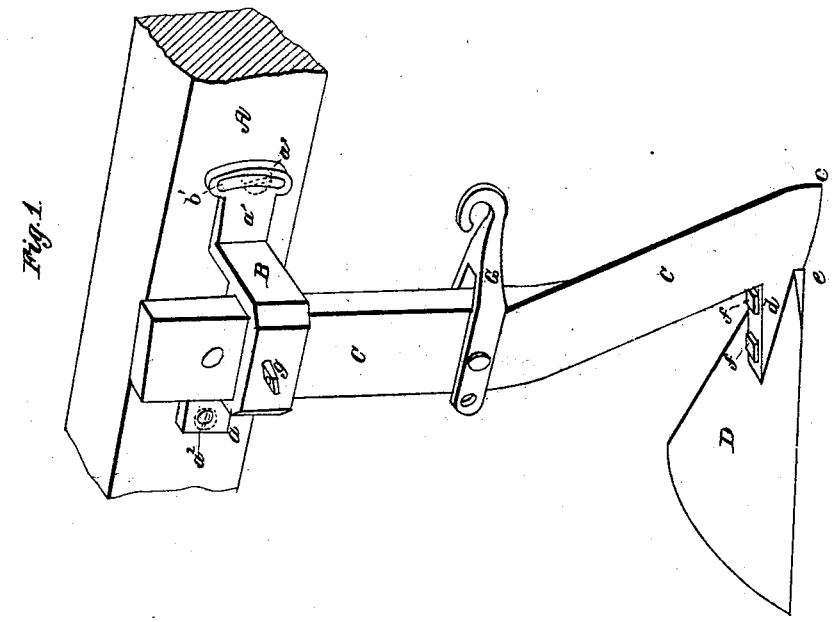

United States Patent Office.

CHARLES R. HARTMAN, OF VINCENNES, INDIANA.

*Letters Patent No. 76,627, dated April 14, 1868.*

IMPROVEMENT IN SUBSOIL-PLOUGH.

*The Schedule referred to in these Letters Patent and making part of the same.*

TO ALL WHOM IT MAY CONCERN:

Be it known that I, CHARLES R. HARTMAN, of Vincennes, in the county of Knox, and State of Indiana, have invented a new and improved Subsoil-Attachment for Ploughs; and I do hereby declare that the following is a full, clear, and exact description thereof, reference being had to the accompanying drawings, making a part of this specification, in which—

Figure 1 is a perspective view of the improved subsoil-device.
Figure 2 is a side view of the same.
Figure 3 is a top view, and
Figure 4 is a horizontal section through the coulter, taken at the point indicated by red line $x\ x$ in fig. 2.
Similar letters of reference indicate corresponding parts in the several figures.

This invention relates to a new and improved implement, which is adapted for being secured to a common plough-beam, in rear of a turn-plough, and which is designed for running in the furrow made by the plough, and throwing up and loosening the subsoil.

The nature of my invention consists in a vertically and longitudinally-adjustable coulter, having its lower portion sharpened and bent forward of the line of its upper portion or standard, and otherwise so constructed as not to be readily impeded in its passage through the soil by roots and other obstructions, said coulter being provided with a concavo-convex and triangular shovel, which is secured to an extension formed on its heel in such manner as not to prevent the free passage of the shovel through the soil, nor to offer obstructing projections which would prevent the earth from scouring the shovel and keeping its surface smooth, all as will be hereinafter explained.

To enable others skilled in the art to understand my invention, I will describe its construction and operation.

In the accompanying drawings, A represents a portion of a common plough-beam, to one side of which the coulter and its standard are applied, by means of a guide-box, B, from which project two wings $a\ a^1$, one of which is secured to the beam A by means of a pivot-pin, $a^2$, and the other wing is secured by means of a bolt, $a^3$, which passes transversely through a slot, $b$, made through this wing.

This slot is concentric to the pin $a^2$, so that, when the bolt $a^3$ is loosened, the coulter and its standard can be adjusted longitudinally in the arc of a circle, and set to run at any desired pitch or inclination with respect to the plough-beam.

The coulter or cutter C is formed on a standard, C′, and bent forward at an obtuse angle, as shown in figs. 1 and 2, so as to make a draw or shear-cut, and allow roots and other objects which it does not cut through to slide upward, and thus escape without offering any serious obstruction. The point of the coulter C is rounded, as shown at $c$, for allowing roots and other objects which are too deeply seated in the soil to pass upward, to escape beneath the lower end of the coulter. The heel of this coulter is extended backward, and tapered as shown at $d$, and this rear extension is arranged slightly above the sole of the coulter, so as to leave an abutment or shoulder at $e$, against which the point of the shovel D abuts, and is confined in place by means of bolts $f\ f$, as shown in figs. 1 and 2. The bolts $f$ are inserted from the bottom side of the shovel D, through this shovel and the coulter-extension, $d$, and they receive the nuts on their upper ends. The heads of the nuts being countersunk into the sole of the shovel, and the nuts being located directly in rear of the coulter C, it will be seen that there will be no projection offered which would obstruct the free passage of the shovel through the earth, consequently the upper and lower surfaces of the shovel will be scoured and kept perfectly smooth by the earth.

The shovel D is a triangular plate, with a convex upper surface and a concave sole. Its front pointed end abuts snugly against the shoulder $e$, and its converging edges are sharpened.

The point of this shovel is arranged slightly above the point of the coulter, so that, while this coulter will pass freely through the subsoil, and loosen it, the sharp edge of the inclined coulter C will cut or move out of the way any and all roots and other objects which might break or otherwise injure the thin blade or shovel D.

The standard portion C′ of the coulter C is made rectangular in cross-section, and passed through its adjustable guide-box, B, upon the plough-beam A, where it is held in position by means of the split bolt and spring-key g. Several holes being made through the standard C', they will allow this standard and its coulter to be adjusted vertically, and secured at any desired point, according to the depth it is desired to run the shovel.

Below the guide-box B, and pivoted to the standard C', at its junction with the coulter C, is a hook, G, which may be provided with one or more holes through its shank, for setting it forward or backward, as occasion requires. This hook G is designed to afford an attachment for a short chain, not shown in the drawings, which, in practice, will be attached to the share of a plough, for the purpose of resisting backward strain upon the subsoiler. The chain will be shortened or lengthened, according to the pitch given to the standard and coulter.

Instead of using a key-bolt, g, to secure the standard C' to the guide-box B, a clamp-screw (thumb-screw) may be used in its stead, in which case the standard should have notches made in its front edge, to receive a tooth cast upon the inside of the said guide-box. The screw will be tapped through the back of the box B, so as to abut against the rear edge of the standard.

Having described my invention, what I claim as new, and desire to secure by Letters Patent, is—

1. The concavo-convex and triangular shovel D, secured to an extended heel-piece, d, of the coulter C, and abutting against the shoulder e of said coulter, substantially as described.

2. The construction of the coulter C upon the standard C', so that the upper portion of the cutting-edge of this coulter shall form an obtuse angle with the front edge of the standard C, in combination with the shovel D, applied substantially as described.

CHARLES R. HARTMAN.

Witnesses:
   HENRY S. CAUTHORN,
   AQUILLA P. WOODALL.